United States Patent
Chen et al.

(10) Patent No.: US 8,248,737 B2
(45) Date of Patent: Aug. 21, 2012

(54) MAGNETIC SENSOR INCLUDING AN ELEMENT FOR GENERATING SIGNALS RELATED TO RESISTANCE CHANGES

(75) Inventors: Yonghua Chen, Minneapolis, MN (US); Eric Walter Singleton, Maple Plain, MN (US); Kaizhong Gao, Eden Prairie, MN (US); Mohammed Shariat Ullah Patwari, Eden Prairie, MN (US); Jason Bryce Gadbois, Shakopee, MN (US); Daniel Paul Burbank, Minneapolis, MN (US)

(73) Assignee: Seagate Technology LLC, Cupertino, CA (US)

( * ) Notice: Subject to any disclaimer, the term of this patent is extended or adjusted under 35 U.S.C. 154(b) by 733 days.

(21) Appl. No.: 12/336,216

(22) Filed: Dec. 16, 2008

(65) Prior Publication Data

US 2010/0149696 A1 Jun. 17, 2010

(51) Int. Cl.
*G11B 5/33* (2006.01)
(52) U.S. Cl. ....................................................... 360/313
(58) Field of Classification Search .................. 360/313, 360/324.2
See application file for complete search history.

(56) References Cited

U.S. PATENT DOCUMENTS

| | | | |
|---|---|---|---|
| 6,144,285 A | 11/2000 | Higashi | |
| 6,337,991 B1 | 1/2002 | Li et al. | |
| 7,035,062 B1 | 4/2006 | Mao et al. | |
| 7,151,654 B1 | 12/2006 | Mao et al. | |
| 2007/0091512 A1* | 4/2007 | Nichols et al. | 360/324.2 |

* cited by examiner

*Primary Examiner* — David D Davis
(74) *Attorney, Agent, or Firm* — Jennifer M. Buenzow; Braden Katterheinrich (57) ABSTRACT

A magnetic device includes first and second electrodes and a sensor stack connected to the first and second electrodes proximate a sensing surface of the magnetic sensor. A resistive element is connected to the first and second electrodes in parallel or in series with the sensor stack and adjacent the sensing surface. In some embodiments, the resistive element is configured to generate signals related to changes in its resistance. A controller to respond to the resistive element signals can also be included.

10 Claims, 8 Drawing Sheets

MAGNETIC SENSOR INCLUDING AN ELEMENT FOR GENERATING SIGNALS RELATED TO RESISTANCE CHANGES

BACKGROUND

In magnetic recording systems, a rapid increase in the areal density of magnetic media has led to reduction of the spacing between the head and the medium down to less than 10 nm. Maintaining a constant head-to-medium spacing (HMS) is important throughout the life of the magnetic recording system, since the close proximity of the head to the medium makes the drive susceptible to reliability issues that could lead to temporary modulation of the HMS. In addition, it is important to be able to detect and map defects or asperities on the magnetic medium to prevent collisions between the head and medium during operation. Most conventional recording systems do not provide reliable approaches to monitoring the HMS or detecting asperities on the medium in-situ.

The difference in temperature between the head and the medium results in heat transfer during operation, which may be represented by:

$$q = \frac{K \Delta T}{h + \frac{cT}{p}} \quad \text{(Equation 1)}$$

where q is the amount of heat transferred between the head and the medium, h is the separation between the head and the medium, p is the pressure at the sensor, c is a constant that depends on the molecular properties of the air surrounding the head and the medium, T is the ambient temperature, K is the conductivity of air, and $\Delta T$ is the difference in temperature between the head and the medium. Thus, because the amount of heat transferred between the head and the medium is proportional to $\Delta T$ and inversely proportional to h, the temperature at the medium confronting surface of the head may be measured to continuously monitor changes in the HMS.

Some conventional systems attempt to capitalize on this phenomenon by monitoring temperature changes in the reader of the head. However, in order to improve the detection sensitivity of the reader, the reader element had to be biased at a relatively high voltage to sense the change in resistance in the reader element caused by the temperature change. This can lead to compromised reader life and, because the reader is highly magnetoresistive, can also make it difficult to differentiate between the thermally and magnetically induced components of resistance change in the reader.

SUMMARY

One embodiment of the present invention includes a magnetic device having first and second electrodes and a sensor stack connected to the first and second electrodes proximate a sensing surface of the magnetic sensor. A resistive element is connected to the first and second electrodes in parallel or in series with the sensor stack and adjacent the sensing surface.

Another embodiment includes a magnetic device having a sensor assembly and a resistive element. The sensor assembly has a sensing surface and a sensor stack connected to first and second electrodes. The resistive element is adjacent the sensing surface, connected to at least one of the first and second electrodes, and generates signals related to changes in its resistance.

An additional embodiment includes a magnetic recording system having a sensor assembly, a resistive element and a controller. The sensor assembly has a sensing surface and a sensor stack connected to first and second electrodes near the sensing surface. The resistive element is adjacent the sensing surface, connected to at least one of the first and second electrodes, and generates signals related to changes in its resistance. The controller controls the distance between the magnetic recording system and a magnetic medium in response to the resistive element's signals.

DETAILED DESCRIPTION

Figure 1:
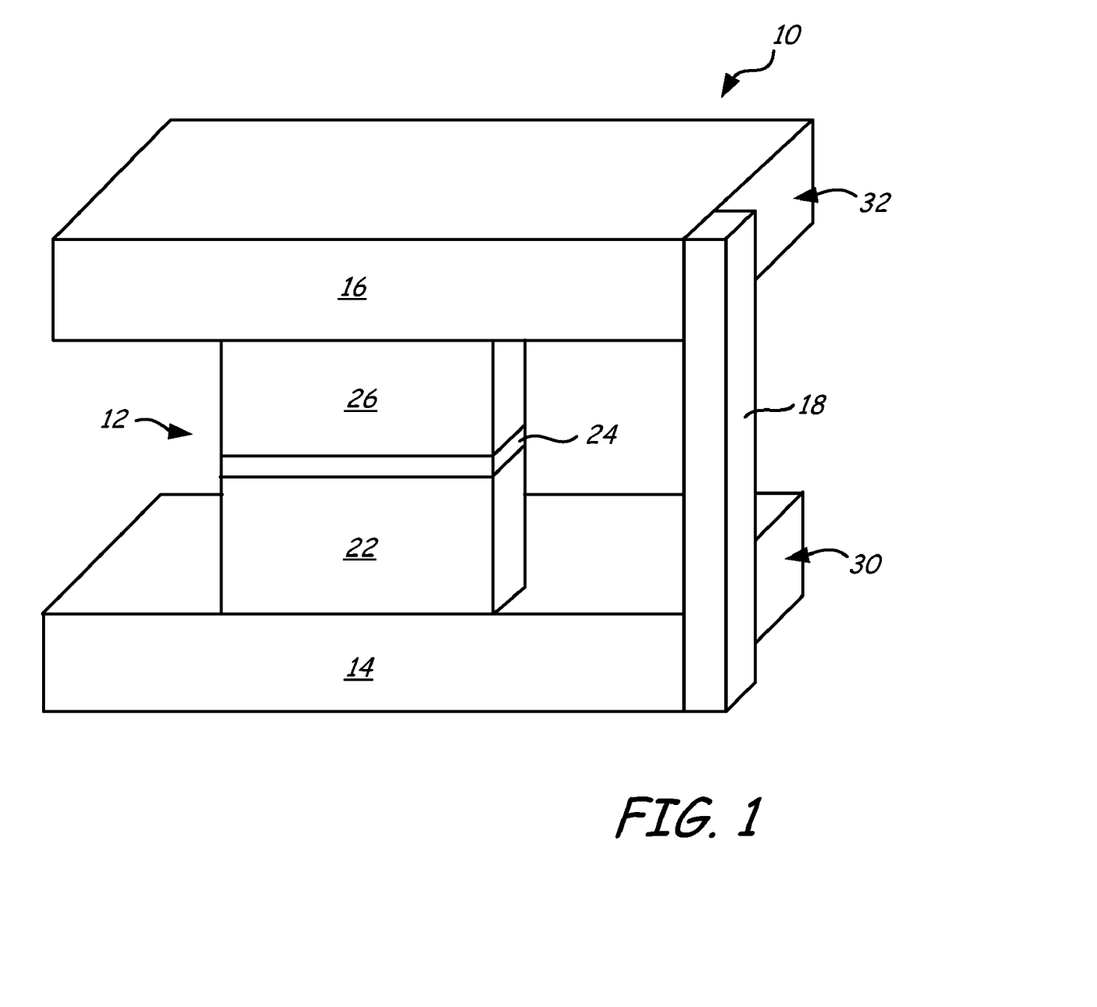
FIG. 1 is a perspective view of a magnetic sensor stack connected to first and second electrodes in parallel with a resistive element connected to sides of the electrodes.

FIG. 1 is perspective sensing surface (or, in certain embodiments, an air bearing surface) view of magnetic sensor assembly 10 including magnetic sensor stack 12 connected between first electrode 14 and second electrode 16. In some embodiments, magnetic sensor assembly 10 is arranged such that a sensing surface faces a magnetic medium (not shown) to sense magnetic transitions on the magnetic medium. Resistive element 18 is connected to first electrode 14 and second electrode 16 in parallel with magnetic sensor stack 12. Magnetic sensor stack 12 includes reference layer assembly 22, nonmagnetic spacer layer 24, and free layer 26. Seed layer 20 and cap layer 28 may also be included in some embodiments (see for example, FIGS. 2, 3, 6 and 7). Other layer configurations in addition to these layers are also within the scope of this invention. Magnetic sensor stack 12 and/or resistive element 18 may be formed by depositing successive layers on first electrode 14, or may be formed in a separate process and later connected between first electrode 14 and second electrode 16.

The magnetization of reference layer assembly 22 is fixed while the magnetization of free layer 26 rotates in response to an external magnetic field, such as from a magnetic medium. In some embodiments, reference layer assembly 22 includes a pinned layer and a reference layer magnetically coupled by a coupling layer to form a synthetic antiferromagnet (SAF). Seed layer 20 enhances the grain growth of reference layer assembly 22, and cap layer 28 adds a protective layer to the top of magnetic sensor stack 12. In some embodiments, first electrode 14 and second electrode 16 comprise a magnetic material to function as shields that protect magnetic sensor stack 12 from flux emanated from adjacent tracks and adjacent bits on the magnetic medium.

Sensor assembly 10 produces a signal when a sense current is passed through the layers of magnetic sensor stack 12. In some embodiments, first electrode 14 and second electrode 16 deliver the sense current to magnetic sensor stack 12. The sense current experiences a resistance that is proportional to the angle between the magnetization direction of free layer 26 and the magnetization direction of reference layer assembly 22.

Nonmagnetic spacer layer 24 may be, for example, a nonmagnetic metal, such that sensor assembly 10 exhibits a giant magnetoresistance (GMR), or an insulating material, such that sensor assembly 10 exhibits a tunneling magnetoresistance (TMR). In addition, reference layer assembly 22 may alternatively be replaced by one or more free layers to provide a tri-layer type magnetic sensor.

Resistive element 18 is disposed at or near the sensing surface and is connected to first electrode 14 and second electrode 16 in parallel with magnetic sensor stack 12. In the embodiment shown, resistive element 18 is connected to side surface 30 of first electrode 14 and side surface 32 of second electrode 16 and has a length greater than the length of magnetic sensor stack 12 as shown in FIG. 1. Resistive element 18 may be made of a material having a high thermal coefficient of resistivity (e.g., greater than about +/−0.003/° C. at 20° C.) and low magnetoresistance at operating temperatures of sensor assembly 10 such that the resistance of resistive element 18 is a function of its temperature. In some embodiments, resistive element 18 comprises a material such as Pt, Pd, Au, W, Cr, NiCr, SiCr, Ta, TaN, Cu, Ru, RuO, Ag, VO, FeO, InSb, AgPd5%, NbVO, or $Ti_2O_3$.

The resistance of resistive element 18 is such that current flows through both magnetic sensor stack 12 and resistive element 18 to provide a signal response in resistive element 18 due to changes in resistance. In some embodiments, resistive element 18 has a resistance substantially equal to the resistance across magnetic sensor stack 12. When the resistances of resistive element 18 and magnetic sensor stack 12 are substantially equal, resistive element 18 functions as a current shunt during operation of magnetic sensor stack 12. When sensor stack 12 is shunted with resistive element 18, the thickness of spacer layer 24 may be increased to increase the magnetoresistive ratio of the device while maintaining the same effective resistance across sensor assembly 10. As a result, the output signal and breakdown voltage of sensor assembly 10 is increased, the possibility of deleterious pinholes forming in spacer layer 24 is decreased, and the stability and reliability of the device is improved.

The sense current, which may be alternating current or direct current, is delivered to magnetic sensor stack 12 and resistive element 18 by electrodes 14 and 16, which are connected to a current source (not shown). The voltage drop across resistive element 18 may be measured and monitored to detect changes in the resistance of resistive element 18. The resistance of resistive element 18 may change, for example, due to thermal variations caused by changes in the head to medium spacing (HMS) of sensor assembly 10, thermal spikes caused by collisions between sensor assembly 10 and asperities on a magnetic medium, or changes to the profile of resistive element 18 that occur during fabrication. The voltage drop across resistive element 18 may be determined by measuring the voltage drop between electrodes 14 and 16, or by directly measuring the voltage drop across resistive element 18.

Resistive element 18 as described is simple and cost-effective to fabricate and, since the detection of changes in the resistance across resistive element 18 is based on electrical measurement, the magnetic fields generated by adjacent structures have a minimal effect on the operation of resistive element 18. Also, the response time of resistive element 18 to changes in HMS is very high, so variations in HMS can be detected very quickly. Consequently, resistive element 18 may be employed to not only detect changes in HMS, but also to sense the presence of asperities on a magnetic medium, map the topography of the magnetic medium, and provide real-time control of the HMS by incorporating feedback control of the HMS based on signals from resistive element 18. A system for detecting changes in HMS with resistive element 18, controlling the HMS based on signals from resistive element 18, and sensing the presence of asperities on a magnetic medium will be described in more detail with regard to FIG. 4.

Figure 2:
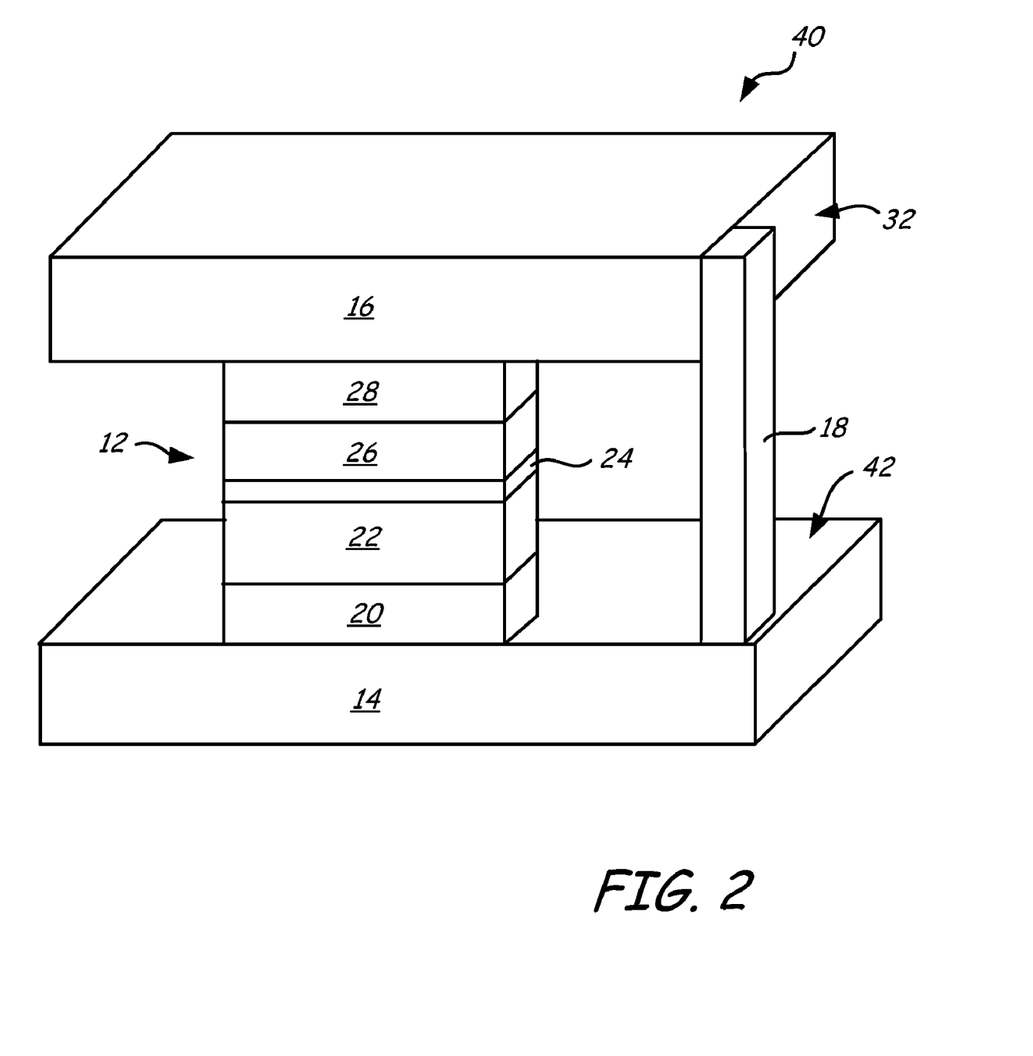
FIG. 2 is a perspective view of a magnetic sensor stack connected to first and second electrodes in parallel with a resistive element connected to a major surface of the first electrode and a side of the second electrode.
Figure 3:
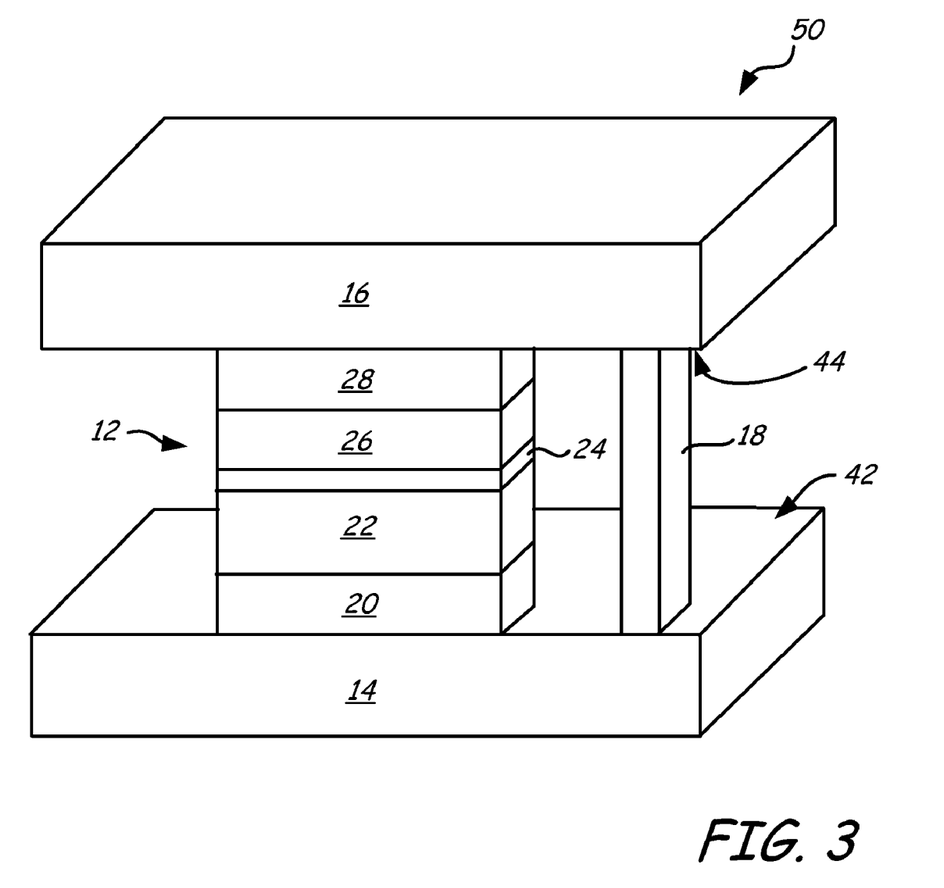
FIG. 3 is a perspective view of a magnetic sensor stack connected to first and second electrodes in parallel with a resistive element connected to major surfaces of the first and second electrodes.

While resistive element 18 is shown connected to side surface 30 of first electrode 14 and side surface 32 of second electrode 16, it will be appreciated that resistive element 18 may be connected to electrodes 14 and 16 in other configurations. For example, FIG. 2 is a perspective sensing surface view of magnetic sensor assembly 40 including magnetic sensor stack 12 connected between first electrode 14 and second electrode 16, and resistive element 18 connected to major surface 42 of first electrode 14 and to side surface 32 of second electrode 16. Resistive element 18 still has a relative length greater than the length of magnetic sensor stack 12, but less than resistive element 18 of FIG. 1. As another example, FIG. 3 is a perspective sensing surface view of magnetic sensor assembly 50 including magnetic sensor stack 12 connected between first electrode 14 and second electrode 16, and resistive element 18 connected to major surface 42 of first electrode 14 and to major surface 44 of second electrode 14. In this embodiment, resistive element 18 has a relative length that is approximately equal to the length of magnetic sensor stack 12. The selected arrangement of resistive element 18 with respect to electrodes 14 and 16 may be based on the target resistance for resistive element 18, the desired response of resistive element 18 to resistive variations, the arrangement that is most desirable for fabrication purposes, or other considerations.

Figure 4:
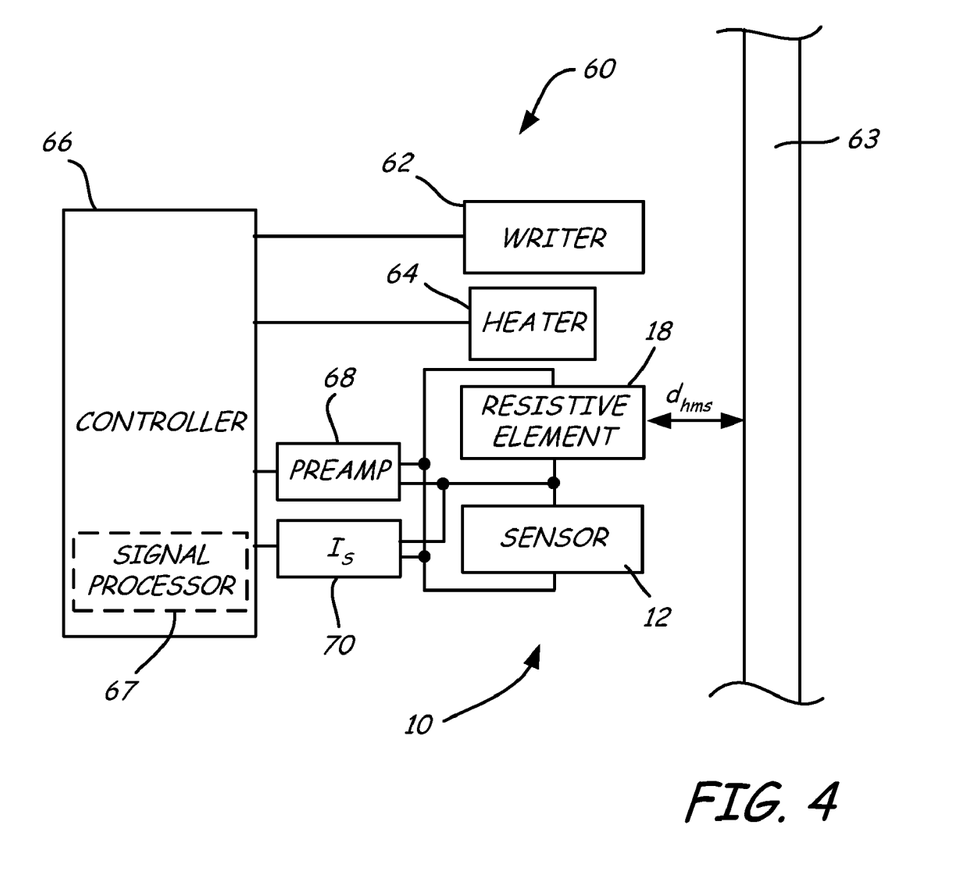
FIG. 4 is a block diagram of a system for providing in-situ control of the head-to-medium spacing based on signals provided by the resistive element in parallel with the magnetic sensor stack.

As described above, resistive element 18 is also operable to generate signals related to changes in resistance caused by thermal variations in resistive element 18 due to changes in the HMS of sensor assembly 10 and due to collisions with asperities on a magnetic medium. FIG. 4 is a block diagram of feedback control system 60 for measuring and adjusting the HMS of a transducing head including sensor assembly 10 and writer 62 in response to changes in the distance $d_{hms}$ to magnetic medium 63 as detected by resistive element 18. Control system 60 also includes writer heater 64, controller 66, preamplifier circuit 68, and sense current source 70. Controller 66 provides signals to and/or receives signals from sensor assembly 10, writer 62, writer heater 64, preamplifier 68, and sense current source 70. Magnetic sensor stack 12 and resistive element 18 are connected in parallel with preamplifier 68 and current source 70.

In operation, controller 66 controls operation of sensor stack 12 and writer 62 to read information from and write information to magnetic medium 63. Controller 66 also measures the resistance across resistive element 18 to monitor thermal variations caused by changes in HMS. Controller 66 operates sense current source 70 to provide the sense current in parallel to both magnetic sensor stack 12 and resistive element 18. Preamplifier 68 then provides a signal related to the voltage sensed between electrodes 14 and 16 to controller 66. The signal provided by preamplifier 68 to controller 66 has a higher frequency component that includes information about data read from magnetic medium 63 by magnetic sensor stack 12, and a lower frequency component that includes information about the resistance of resistive element 18. In some embodiments, the higher frequency component is a gigahertz (GHz) range frequency signal and the lower frequency component is a megahertz (MHz) range frequency signal. Controller 66 extracts and separates the signals related to operation of magnetic sensor stack 12 and resistive element 18 to process data from magnetic medium 63 and to determine the resistance across resistive element 18. In some embodiments, signal separation and extraction can be achieved through signal processor 67.

Controller 66 may compare the measured resistance of resistive element 18 to a stored resistance related to a normal HMS to determine whether the $d_{hms}$ has increased or decreased. Based on this determination, controller 66 adjusts separation $d_{hms}$ back to the normal HMS. In control system 60, controller 66 may accomplish this by operating heater 64 to heat magnetic sensor stack 12 and/or writer 62. The change in temperature causes the contours of magnetic sensor stack 12 and/or writer 62 to change at the sensing surface, resulting in a change in the HMS. Since the level of heating of magnetic sensor stack 12 and/or writer 62 may be controlled to produce the desired level of change in the HMS, and because the response time of resistive element 18 to changes in the HMS is fast, controller 66 can adjust the HMS to the normal HMS very quickly.

In addition to being able to dynamically control the HMS of the transducing head, the real-time detection of the HMS with resistive element 18 has other applications. For example, the resistance of resistive element 18 may be monitored to detect the presence of asperities and other irregularities protruding from the surface of magnetic medium 63. When resistive element 18 encounters or collides with an asperity on magnetic medium 63, resistive element 18 experiences a sharp increase or spike in temperature resulting from frictional heating associated with the contact forces between resistive element 18 and the asperity. This temperature spike results in a detectable change in the resistance across resistive element 18. After contact with the asperity, the temperature of resistive element 18 may be monitored as it recovers from the contact event and reverts to the normal operating HMS. In this way, the transducing head may return to normal operation (and rewrite or reread any skipped or missed data caused by the contact event) after the HMS returns to normal. In addition, controller 66 may monitor the thermal variations in resistive element 18 to generate a map of the topography of magnetic medium 63. Thus, because resistive element 18 is sensitive to irregularities on magnetic medium 63 at the nanometer level, control system 60 may be used to screen out media with a large number of asperities during media quality certification.

Figure 5A:
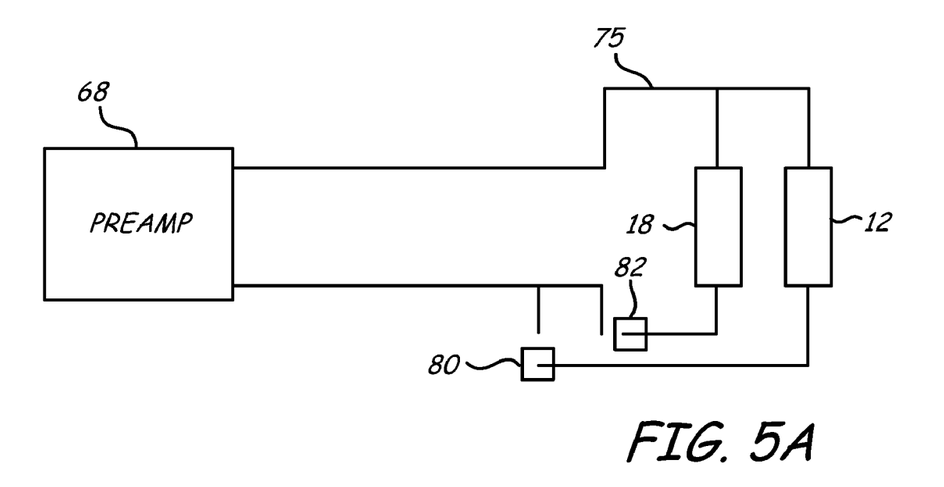
FIG. 5A is a schematic view of a portion of the system shown in FIG. 4 configured to separately measure the resistance of the sensor and the resistive element.

Resistive element 18 is also configurable to provide signals related to changes in the resistance of resistive element 18 caused by modification of the sensing surface of sensor assembly 10. FIG. 5A is a schematic view of a portion of the system shown in FIG. 4 configured to separately measure the resistance of magnetic sensor stack 12 and resistive element 18. Trace 75 is connected between preamplifier 68 and a side of each of magnetic sensor stack 12 and resistive element 18 (via electrode 14 or 16, for example). Another side of magnetic sensor stack 12 is connected to half bond pad 80, and another side of resistive element 18 is connected to half bond pad 82. Half bond pads 80 and 82 are not connected to each other or to preamplifier 68. The leads connected to half bond pads 80 and 82 may be fabricated using photopatterning techniques, for example.

When a slider or other device including sensor assembly 10 is extracted from a wafer, the next step can be to modify sensor assembly 10 (such as by lapping or polishing) to reduce the distance between the sensing surface and the surface of magnetic sensor stack 12 opposite the sensing surface. This distance is sometimes referred to as the stripe height of magnetic sensor stack 12. The resistance of magnetic sensor stack 12 is generally inversely proportional to the stripe height, and thus the resistance of magnetic sensor stack 12 may be monitored during fabrication to assure the proper stripe height is achieved. However, many contemporary sensors include metallic material that may smear during modification of the sensing surface. If this metallic material smears across the nonmagnetic layer that generates the magnetoresistive response, variations in the resistance across magnetic sensor stack 12 may occur.

Since the resistance of resistive element 18 also scales with the resistance of magnetic sensor stack 12, the resistance of resistive element 18 may be monitored while the sensing surface is modified to determine how much material should be removed from the sensing surface to achieve the desired stripe height. The change in resistance in resistive element 18 may be measured by applying a current between trace 75 and half bond pad 82 with preamplifier 68 and measuring the resulting voltage drop. The resistance across resistive element 18 may be continually monitored until the desired stripe height is achieved.

Figure 5B:
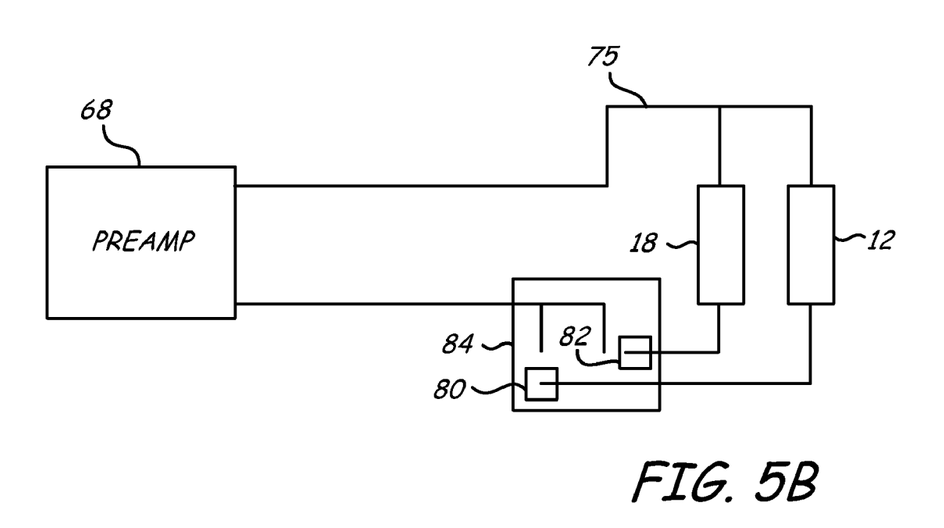
FIG. 5B is a schematic view of a portion of the system shown in FIG. 4 with the sensor and resistive element connected in parallel.

When modification of the sensing surface is completed, half bond pads 80 and 82 may be connected to preamplifier 68, thereby connecting magnetic sensor stack 12 and resistive element 18 in parallel across preamplifier 68. This connects resistive element 18 in the shunting arrangement with magnetic sensor stack 12 described above. This may be accomplished by connecting half bond pads 80 and 82 to preamplifier 68 with conductive element 84, as shown in FIG. 5B. In some embodiments, conductive element 84 is a bond pad fabricated as part of the head gimbal assembly (HGA) in a magnetic recording system.

Figure 6:
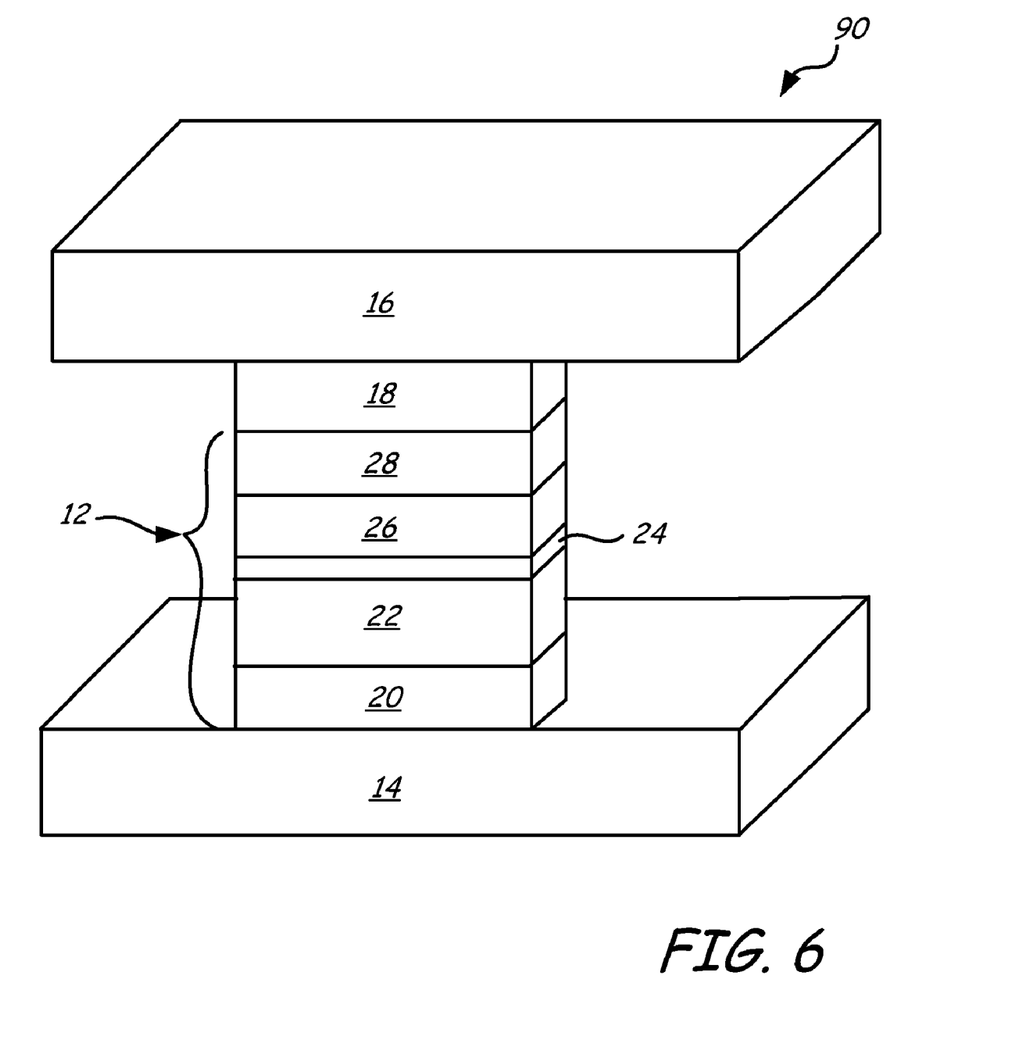
FIG. 6 is a perspective view of a magnetic sensor stack connected to first and second electrodes in series with a resistive element.
Figure 7:
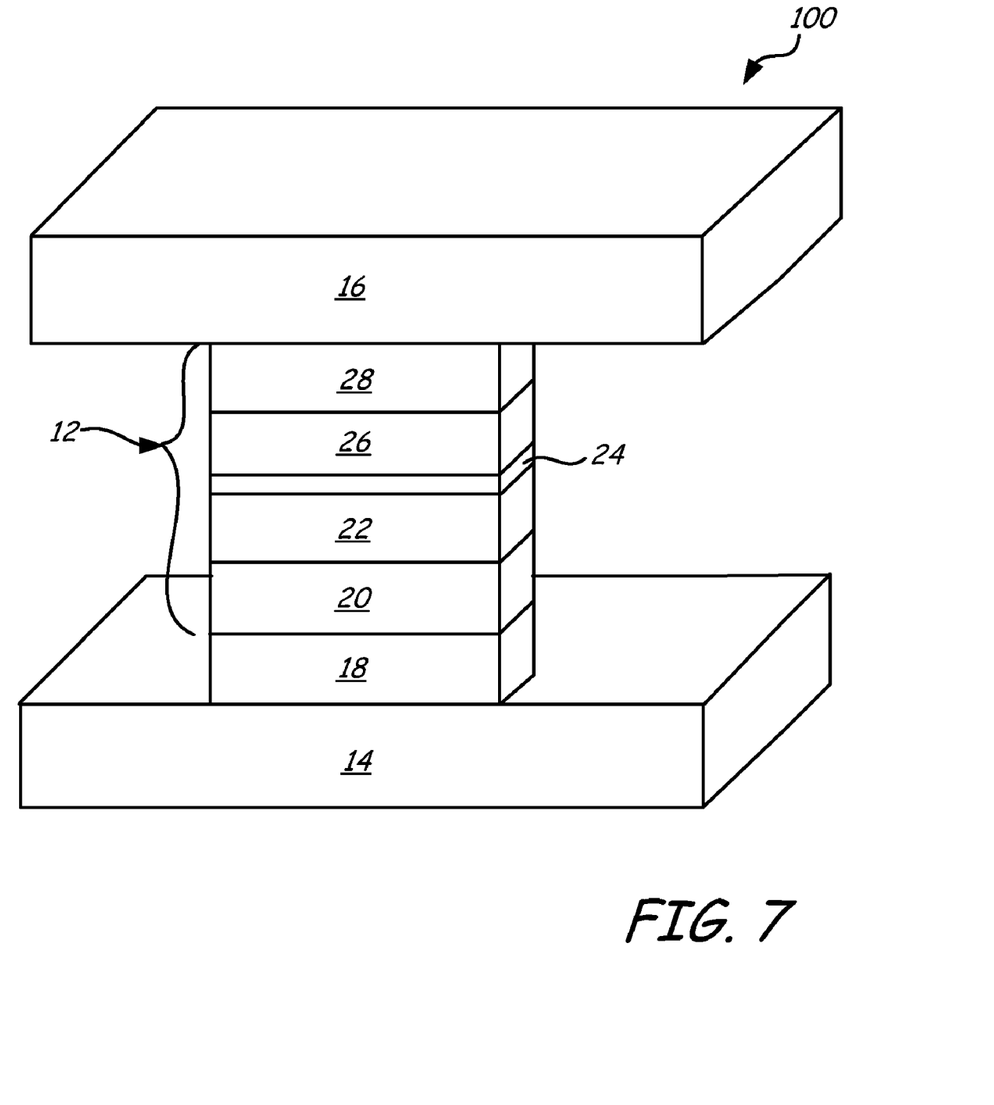
FIG. 7 is a perspective view of an alternate embodiment of a magnetic sensor stack connected to first and second electrodes in series with a resistive element.

While the embodiments in FIGS. 1 through 5B illustrate resistive element 18 in parallel with magnetic sensor stack 12, resistive element 18 is serially connected with magnetic sensor stack 12 in other embodiments. When connected in series with magnetic sensor stack 12, resistive element 18 is disposed at or near the sensing surface and is connected to first electrode 14 or second electrode 16 and magnetic sensor stack 12. For example, FIG. 6 is a perspective sensing surface view of magnetic sensor assembly 90 including magnetic sensor stack 12 connected between first electrode 14 and resistive element 18. Resistive element 18 connects to magnetic sensor stack 12 at cap layer 28. Resistive element 18 is also connected to second electrode 16. As another example, FIG. 7 is a perspective sensing surface view of magnetic sensor assembly 100 including magnetic sensor stack 12 connected between second electrode 16 and resistive element 18. Resistive element 18 connects to magnetic sensor stack 12 at seed layer 20. Resistive element 18 is also connected to first electrode 14.

Resistive element 18 functions in series connection with magnetic sensor stack 12 in a similar way to when it is in parallel with magnetic sensor stack 12. The voltage drop across resistive element 18 may be measured and monitored to detect changes in the resistance of resistive element 18. The voltage drop across resistive element 18 in series connection with magnetic sensor stack 12 can be determined by separating the frequency component representing changes in resistance of resistive element 18 from the frequency component representing changes in resistance of magnetic sensor stack 12. In some embodiments, resistive element 18 has a resistance lower than the resistance across magnetic sensor stack 12.

As described above for the parallel configuration, resistive element 18 in series connection with magnetic sensor stack 12 may be employed to not only detect changes in HMS, but also to sense the presence of asperities on a magnetic medium, map the topography of the magnetic medium, and provide real-time control of the HMS by incorporating feedback control of the HMS based on signals from resistive element 18.

Figure 8:
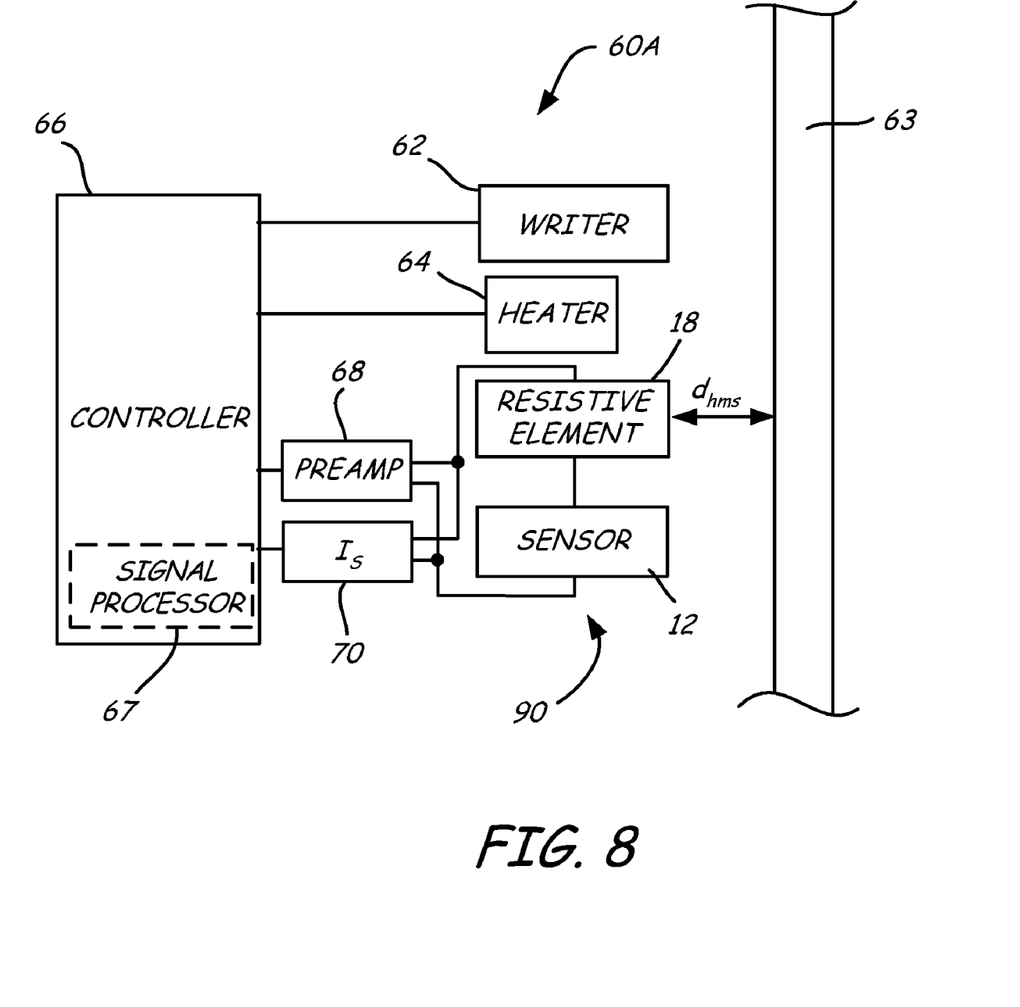
FIG. 8 is a block diagram of a system for providing in-situ control of the head-to-medium spacing based on signals provided by the resistive element in series with the magnetic sensor stack.

FIG. 8 is a block diagram of feedback control system 60A for measuring and adjusting the HMS of a transducing head including sensor assembly 90 and writer 62 in response to changes in the distance $d_{hms}$ to magnetic medium 63 as detected by resistive element 18. As with control system 60, control system 60A also includes writer heater 64, controller 66, preamplifier circuit 68, and sense current source 70. Controller 66 provides signals to and/or receives signals from sensor assembly 90, writer 62, writer heater 64, preamplifier 68, and sense current source 70. Magnetic sensor stack 12 and resistive element 18 are connected in series with preamplifier 68 and current source 70.

Control system 60A operates in similar fashion to control system 60. In operation, controller 66 measures the resistance across resistive element 18 to monitor thermal variations caused by changes in HMS. Controller 66 operates sense current source 70 to provide the sense current in series to magnetic sensor stack 12 and resistive element 18. Preamplifier 68 then provides a signal related to the voltage sensed between electrodes 14 and 16 to controller 66. The signal provided by preamplifier 68 to controller 66 has a higher frequency component that includes information about data read from magnetic medium 63 by magnetic sensor stack 12, and a lower frequency component that includes information about the resistance of resistive element 18. In some embodiments, the higher frequency component is a gigahertz (GHz) range frequency signal and the lower frequency component is a megahertz (MHz) range frequency signal. Controller 66 extracts and separates the signals related to operation of magnetic sensor stack 12 and resistive element 18 to process data from magnetic medium 63 and to determine the resistance across resistive element 18. In some embodiments, signal separation and extraction can be achieved through signal processor 67.

In summary, the present invention relates to a magnetic sensor including first and second electrodes and a sensor stack connected to the first and second electrodes proximate a sensing surface of the magnetic sensor. A resistive element is connected to the first and second electrodes in parallel or in series with the sensor stack and adjacent the sensing surface. The temperature of the resistive element varies with the distance of the magnetic sensor from a magnetic medium, and positioning the resistive element adjacent the sensing surface allows for accurate mapping of the medium topography and for increased sensitivity to contact between the magnetic sensor and medium asperities. In addition, since the resistance of the resistive element scales with the resistance of the sensor stack, the resistive element provides accurate control of the resistance of the sensor stack during fabrication. Furthermore, the resistive element serves as a good lapping guide, providing accurate control of the stripe height of the sensor stack during fabrication.

Although the present invention has been described with reference to exemplary embodiments, workers skilled in the art will recognize that changes may be made in form and detail without departing from the spirit and scope of the invention.

The invention claimed is:

1. A system comprising:
a magnetic head including:
a sensor stack that reads data from a magnetic medium, the sensor stack connected to first and second electrodes, and
a resistive element connected to at least one of the first and second electrodes and separate from the sensor stack, wherein the resistive element is configured to generate signals related to changes in resistance of the resistive element; and
a controller that controls head-to-medium spacing in response to the signals related to changes in resistance of the resistive element.

2. The system of claim 1 further comprising a signal processor for separating the signals related to changes in resistance of the resistive element from signals related to changes in resistance of the sensor stack.

3. The system of claim 1, wherein the resistive element is connected in series with the sensor stack, and wherein a resistance of the resistive element is lower than a resistance of the sensor stack.

4. The system of claim 1, wherein the controller is operable to map a topography of the magnetic medium based on the resistive element signals.

5. The system of claim 1, wherein the resistive element further generates signals related to thermal variations caused by contact between the resistive element and asperities on the magnetic medium.

6. The system of claim 1, wherein the resistive element comprises a material selected from the group consisting of Pt, Pd, Au, W, Cr, NiCr, SiCr, Ta, TaN, Cu, Ru, RuO, Ag, VO, FeO, InSb, AgPd5%, NbVO, $Ti_2O_3$ and combinations thereof.

7. The system of claim 2, wherein the signals related to changes in resistance of the resistive element have a lower frequency component than the signals related to changes in resistance of the sensor stack.

8. The system of claim 2, wherein the controller is adapted to compare the resistance of the resistive element to a stored resistance related to a normal head-to-medium spacing.

9. The system of claim 8, wherein the controller is further adapted to adjust head-to-medium spacing to the normal head-to-medium spacing.

10. The system of claim 1, wherein the controller adjusts head-to-medium spacing by operating a heater to heat the sensor stack.

* * * * *